United States Patent [19]

Nagira et al.

[11] Patent Number: 4,752,463

[45] Date of Patent: Jun. 21, 1988

[54] METHOD OF PRODUCING HYDROGEN AND MATERIAL USED THEREFOR

[75] Inventors: Katsuhiro Nagira; Toru Shimizu, both of Agamasaki, Japan

[73] Assignee: Osaka Fuji Kogyo, Ltd., Amagasaki, Japan

[21] Appl. No.: 903,770

[22] Filed: Sep. 5, 1986

[30] Foreign Application Priority Data

Jun. 3, 1986 [JP] Japan .................................. 61-129886
Jun. 21, 1986 [JP] Japan .................................. 61-145473

[51] Int. Cl.$^4$ .......................... C22C 21/00; C01B 6/00
[52] U.S. Cl. ................................... 423/657; 428/650; 420/528; 420/589
[58] Field of Search .................. 423/657, 644, 648 R; 420/589, 528; 428/650–654, 643, 644

[56] References Cited

U.S. PATENT DOCUMENTS 4,017,414 4/1977 Black et al. ..................... 252/188
4,264,362 4/1981 Serger et al. ........................ 75/243
4,269,818 5/1981 Suzuki .................................. 423/657
4,298,439 11/1981 Gaffney ........................... 204/157.1

FOREIGN PATENT DOCUMENTS 40291 4/1974 Japan ................................... 423/657
728363 12/1981 U.S.S.R. ............................. 423/657

Primary Examiner—Christopher W. Brody
Attorney, Agent, or Firm—Saidman, Sterne, Kessler & Goldstein

[57] ABSTRACT

A hydrogen-producing material comprises an aluminum alloy consisting essentially of 5 to 50% of tin and the balance being aluminum and inevitable impurities. The material may comprise a deposit composed of flat fine particles of the aluminum alloy, for example, a spray deposit formed on a base by thermal spraying with a wire of an aluminum alloy consisting essentially of 5 to 50% of tin and the balance being aluminum and inevitable impurities.

20 Claims, 6 Drawing Sheets

METHOD OF PRODUCING HYDROGEN AND MATERIAL USED THEREFOR

FIELD OF THE INVENTION

This invention relates to a hydrogen-producing material.

BACKGROUND OF THE INVENTION

As a method for hydrogen production based on chemical decomposition of water, there are known those such as, for example, the reaction of a metal with an acid or water, thermal decomposition and electrolysis. The reaction of metal with an acid or water can be carried out at room temperature, but it is difficult to use it industrially because of its low productivity. For this reason, the thermal decomposition and electrolysis of water have been used on an industrial scale. However, these methods require a large quantity of electric energy or thermal energy, resulting in increase in manufacturing cost.

The present invention is made from such a background. It is well known that aluminum reacts with oxygen in air at room temperature and passivation occurs owing to the formation of a highly stable oxide film on its surface. This oxide film provides resistance to corrosion by seawater and other aqueous and chemical solutions, so that aluminum and its alloys are employed in various applications. The inventors of this invention have now found that a binary aluminum alloy containing a certain amount of tin reacts with water even at room temperature and produces hydrogen without use of any chemicals. It has also been found that the rate of hydrogen production varies significantly with increasing tin content and with increasing temperature of water.

SUMMARY OF THE INVENTION

It is therefore an object of the present invention to provide a cheap hydrogen-producing material that makes it possible to produce hydrogen gas of a high purity at a high efficiency.

Another object of the present invention is to provide a method for producing hydrogen at a low cost and at a high efficiency without use of a large quantity of electric or thermal energy.

According to the present invention these and other objects are achieved by providing a hydrogen-producing material comprising an aluminum alloy consisting essentially of 5 to 50% of tin and the balance being aluminum and inevitable impurities.

According to the present invention there is further provided a hydrogen-producing material comprising a deposit composed of flat fine metal particles, said metal particles comprising an aluminum alloy consisting essentially of 5 to 50% of tin and the balance being aluminum and inevitable impurities. Preferably, the hydrogen-producing material comprises a spray deposit formed on a base by a thermal spraying with a wire of an aluminum alloy consisting essentially of 5 to 50% of tin and the balance being aluminum and inevitable impurities.

The invention is also directed to methods by which said tin-aluminum binary alloys may be used to generate hydrogen gas of high purity at high efficiency.

As a material for the base, there may be used those such as, for example, metals, plastics, glasses and ceramics. The metals for the base include, without being limited to, those such as mild steels, aluminum, copper and their alloys. The plastics for the base include, without being limited to, those such as acrylic resins, phenolic resins and polycarbonates. The base may take any form and may be used in the form of plates, sheets, bands and the like.

DESCRIPTION OF THE PREFERRED EMBODIMENTS

According to the present invention, the hydrogen producing material comprising an aluminum alloy containing 5 to 50% Sn may be produced by a continuous casting process disclosed in Japanese Pat. No. 1,049,146 which is incorporated herein by reference. In this process a molten alloy of aluminum and tin is fed to a heating mold maintained at a temperature not less than the freezing point of the metal, and a casting is continuously withdrawn from the mold. The castings of aluminum alloys per se may be used as a hydrogen-producing material. It is, however, preferred to use it in the form of sheets, powder, spray deposits, and the like to improve the rate of hydrogen production.

The hydrogen-producing material comprising a deposit formed on the base may be produced by a thermal spraying with a wire of an aluminum alloy consisting essentially of 5 to 50% of tin and the balance being aluminum and inevitable impurities. The deposit may be formed by directly spraying a molten alloy from a furnace onto the base.

The tin content of the hydrogen-producing material has been limited to the above range for the following reasons. If the content of tin in aluminum alloy is less than 5% or more than 50%, the aluminum alloy scarcely reacts with water and no hydrogen gas is produced.

The hydrogen-producing material according to the present invention reacts with water even at room temperature and produces hydrogen gas with the purity of 99.4% and above. The rate of hydrogen production varies considerably with the tin content and with the physical form of the hydrogen producing material. Particularly, the rate of hydrogen production can be improved by the use of a hydrogen producing material comprising a spray deposit of the aluminum alloy containing 10 to 30% Sn. The use of such a material makes it possible to obtain the maximum rate of hydrogen production which is about 70 to 80 times as fast as that of the alloy itself. Also, the hydrogen production rate may be increased by the use of hot water.

Although there is a conventionally used continuous casting process wherein a molten metal is fed to a water-cooled mold, this process can not be applied to production of the hydrogen-producing material of the present invention. The castings produced by this process scarcely react with water and hydrogen gas is scarcely produced even if the castings are subjected to a thermal treatment after molding. It is not clear why such a casting produced by this process does not react with water, but it is believed that this may result from the occurrence of segregation. In the conventional casting process, most of the tin remains in the liquid phase during solidification of aluminum alloys because of the considerably small solid solubility of tin in aluminum and a considerable difference in melting points between aluminum and tin.

EXAMPLE 1

Figure 1:
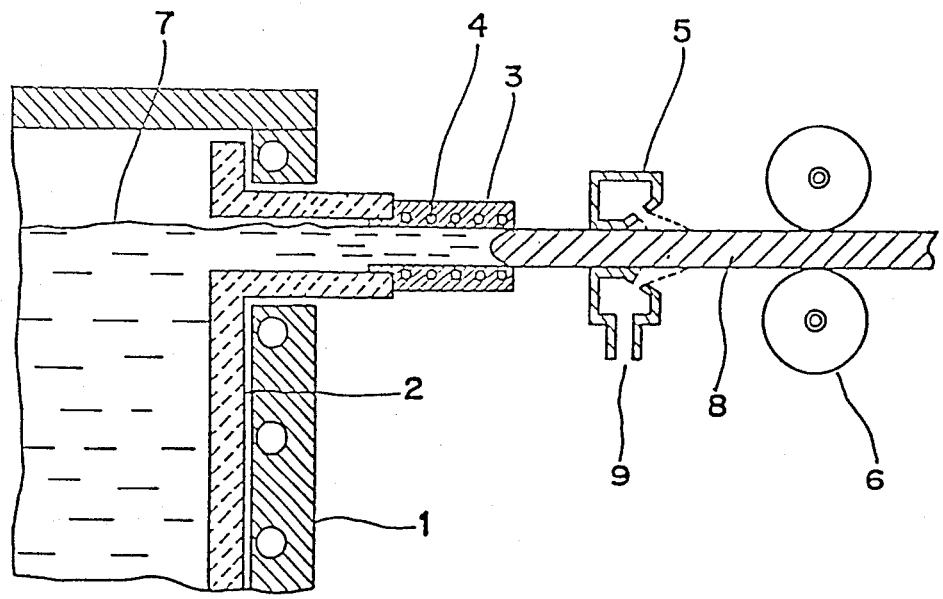
FIG. 1 is a schematic section view of a continuous molding device used for production of hydrogen-producing aluminum alloys according to the present invention.

For the production of hydrogen-producing aluminum alloys there was used a continuous casting device shown in FIG. 1 that comprises an electric furnace 1 with an electric heater, a graphite crucible 2 arranged in the furnace, a heating mold 3 with an electric heater 4, a cooling device 5 and pinch rollers 6.

Using aluminum (Al) of 99.99% purity and tin (Sn) of 99.9% purity as raw materials, there was prepared a melt 7 of aluminum-tin alloy by mixing them so as to have a composition shown in Table 1 and heating them by the furnace 1. On the other hand, the mold 3 was heated by the heater 4 and maintained at a temperature not less than the freezing point of the aluminum alloy and a dummy bar (not shown) was set in the mold. A forcing rod (not shown) was gradually inserted into the crucible 2 of the furnace 1 to charge the melt into the mold, and then the dummy bar was withdrawn by driving the pinch rollers 6, while feeding water to the cooling device 5. At the outlet of the mold, the melt is allowed to solidify to form a rod 8 with a diameter of 8 mm and then cooled by the cooling device 5. Since the mold is heated to a temperature not less than the freezing point of the alloy, a boundary between the solid shell and melt is formed in a convex form as shown in FIG. 1.

The rod of each aluminum alloy was cold rolled to form a sheet 0.25 mm thick and then cut to prepare test pieces of a 10 mm width, a 50 mm length and 0.25 mm thick.

TABLE 1

| Specimen | composition of aluminum alloy |
| --- | --- |
| 1 | 95 wt % Al-5 wt % Sn |
| 2 | 90 wt % Al-10 wt % Sn |
| 3 | 80 wt % Al-20 wt % Sn |
| 4 | 70 wt % Al-30 wt % Sn |
| 5 | 60 wt % Al-40 wt % Sn |
| 6 | 50 wt % Al-50 wt % Sn |

The rate of hydrogen production was determined in the following manner.

A graduated measuring cylinder was filled with water, inverted and put in a thermostat maintained at a temperature of 20°, 30°, 50° or 75° C. The test piece was put into a flask and then immersed in water by placing the flask beneath the mouth of the cylinder in the thermostat. The gas produced by the reaction of the alloy with water was collected in the cylinder to determine the rate of hydrogen production. The results are shown in Table 2 and FIGS. 3 and 4. Table 2 shows variation of the rate of hydrogen production with temperature for the test piece No. 3.

The gas produced was analyzed and found to contain not less than 99.4% hydrogen.

TABLE 2

| Temperature(°C.) (°C.) | Rate of hydrogen production (ml/hr · cm$^2$) |
| --- | --- |
| 20 | 24 |
| 30 | 34 |
| 50 | 72 |
| 75 | 128 |

As can be seen from the results shown in Table 2, the aluminum alloy according to the present invention reacts with water and produces hydrogen even at a low temperature. Also, the rate of hydrogen production increases with temperature. This means that the rate of hydrogen production may be controlled by controlling the temperature of water.

Figure 2:
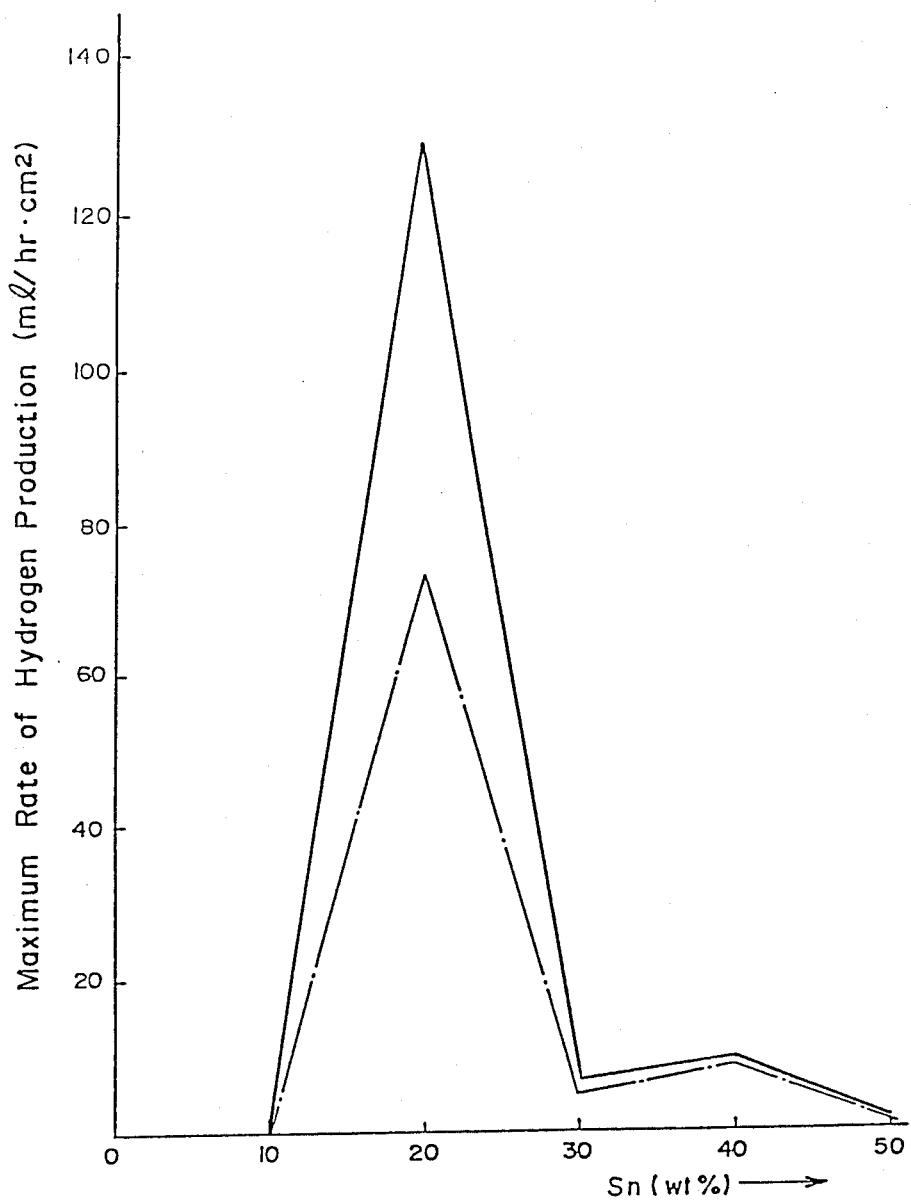
FIG. 2 is a graph showing variation of the maximum rate of hydrogen production with a tin content of an aluminum alloy.

From the results shown in FIG. 2, it will be seen that the aluminum alloy containing less than 5% Sn scarcely reacts with water and no hydrogen gas is produced. The aluminum alloy containing not less than 5% Sn reacts with water and produces hydrogen. The rate of hydrogen production is increased abruptly at the tin content of about 10%, and reached a peak value at the tin content of about 20%. However, if the tin content exceeds 50%, no reaction occurs and no hydrogen gas is produced. The aluminum alloy containing 20% Sn possesses the rate of hydrogen production of 128 ml/hr.cm$^2$ at 75° C., which is about 4 times as fast as that of an old electrolysis process operated at 2 V and a current density of 0.1 A/mm$^2$ (30 ml/hr.cm$^2$). The numbers on the curves correspond to the alloy specimen numbers in Table 1. The rate of hydrogen production at 20° C. is 24 ml/hr.cm$^2$ which is approximately equal to that of the old electrolysis process (22 ml/hr.cm$^2$).

Figure 3:
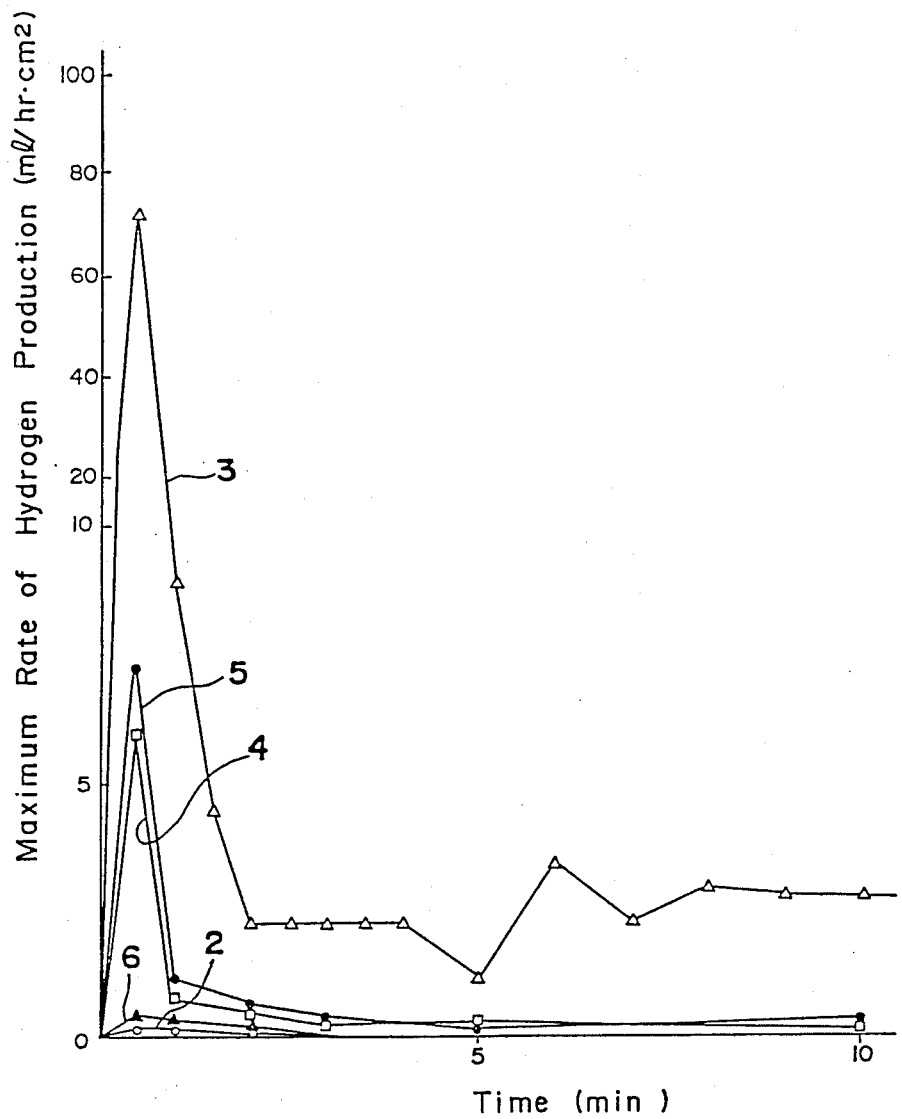
FIGS. 3 and 4 are graphs showing variations of the hydrogen production rate with time at a temperature of 50° or 70° C. for various hydrogen-producing materials of the present invention.
Figure 4:
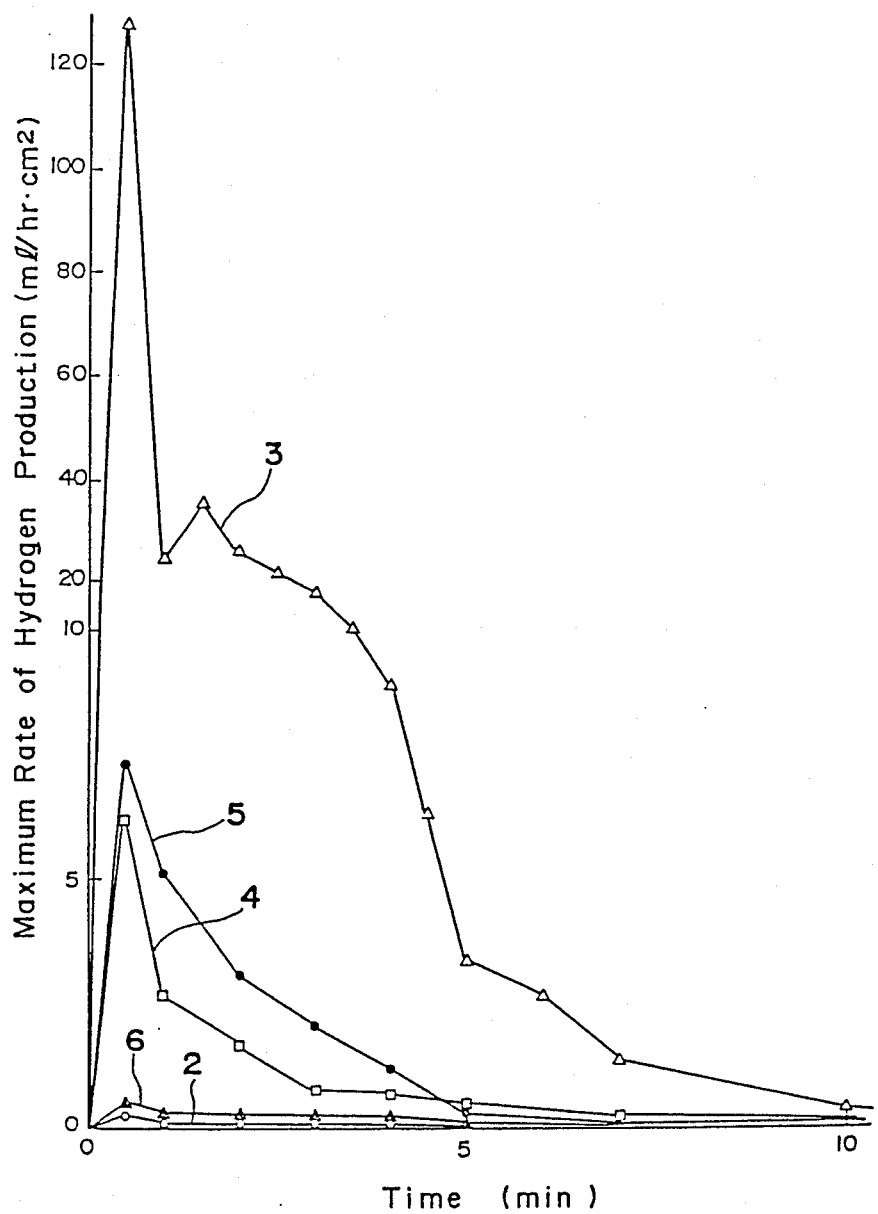

FIGS. 3 and 4 show variations of the maximum rate of hydrogen production with time at 50° and 75° C. for various hydrogen-producing alloys of the present invention. From these figures, it will be seen that the rate of hydrogen production depends on the tin content and rises with increasing temperature.

EXAMPLE 2

Aluminum (Al) of 99.99% purity and tin (Sn) of 99.9% purity were put into the electric furnace of FIG. 1 as raw materials to prepare a melt having a composition shown in Table 3. A rod of 8 mm diameter was cast in the same manner as in Example 1. Wire was drawn from the rod to a diameter of 3.2 mm by cold reduction through dies.

TABLE 3

| Wire No. | composition of alloy |
| --- | --- |
| 1 | Al-5 wt % Sn |
| 2 | Al-10 wt % Sn |
| 3 | Al-15 wt % Sn |
| 4 | Al-20 wt % Sn |
| 5 | Al-25 wt % Sn |
| 6 | Al-30 wt % Sn |

TABLE 3-continued

| Wire No. | composition of alloy |
|---|---|
| 7 | Al-40 wt % Sn |
| 8 | Al-50 wt % Sn |

Separate from the above, aluminum plates 5 mm thick and acrylic resin plates 5 mm thick were subjected to abrasive blasting. The blasting was carried out with alumina grit (#30) at a pressure of 6 Kg/mm.

Using each wire, spray deposits 0.5 mm thick were respectively formed on aluminum plates and acrylic resin plate by wire flame spraying and then cut to prepare specimens of hydrogen-producing materials. The spray deposits of specimens Nos. 7 to 14 (Table 4) were formed on the aluminum plates, while those of specimens Nos. 15 to 22 (Table 4) were formed on the acrylic resin plate. The spraying was conducted under the following conditions.

Spraying conditions

| Nozzle diameter: | 3.175 mm |
|---|---|
| Air cap: | ethyl cellulose |
| Gas flow rate: | Acetylene 17 1/min |
| | Oxygen 32 1/min |
| | Air 780 1/min |
| Wire feed rate: | 3.72 m/min |
| Spray distance: | 200 mm |

The spray deposit was then cut to prepare test pieces with a 10 mm width and a 20 mm length. The maximum rate of hydrogen production was determined for each specimen in the same manner as in Example 1. The results are shown in Table 4 and FIGS. 5 and 6.

Figure 5:
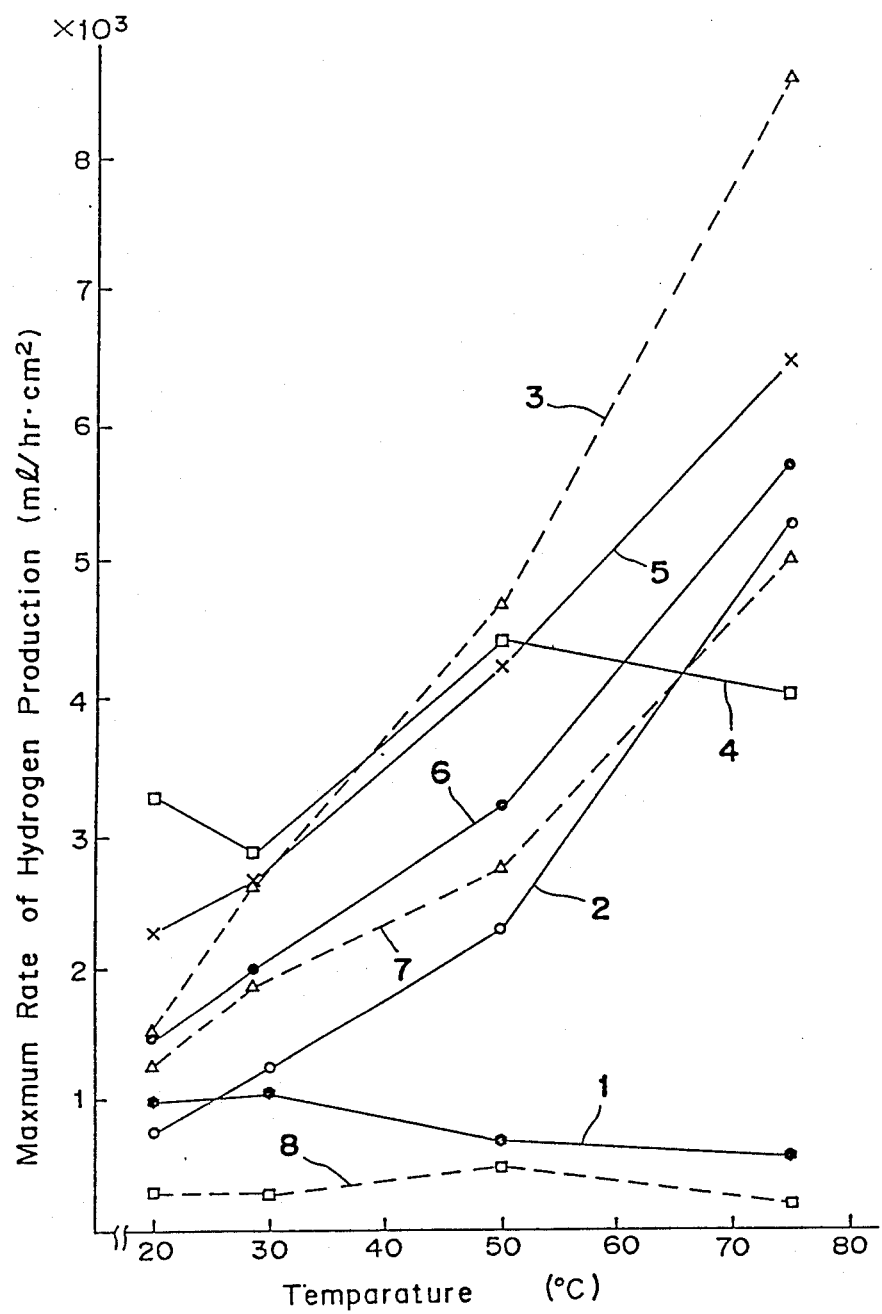
FIG. 5 is a graph showing variations of the maximum rate of hydrogen production with a temperature for various hydrogen-producing materials each being composed of a spray deposit formed on an aluminum plate.
Figure 6:
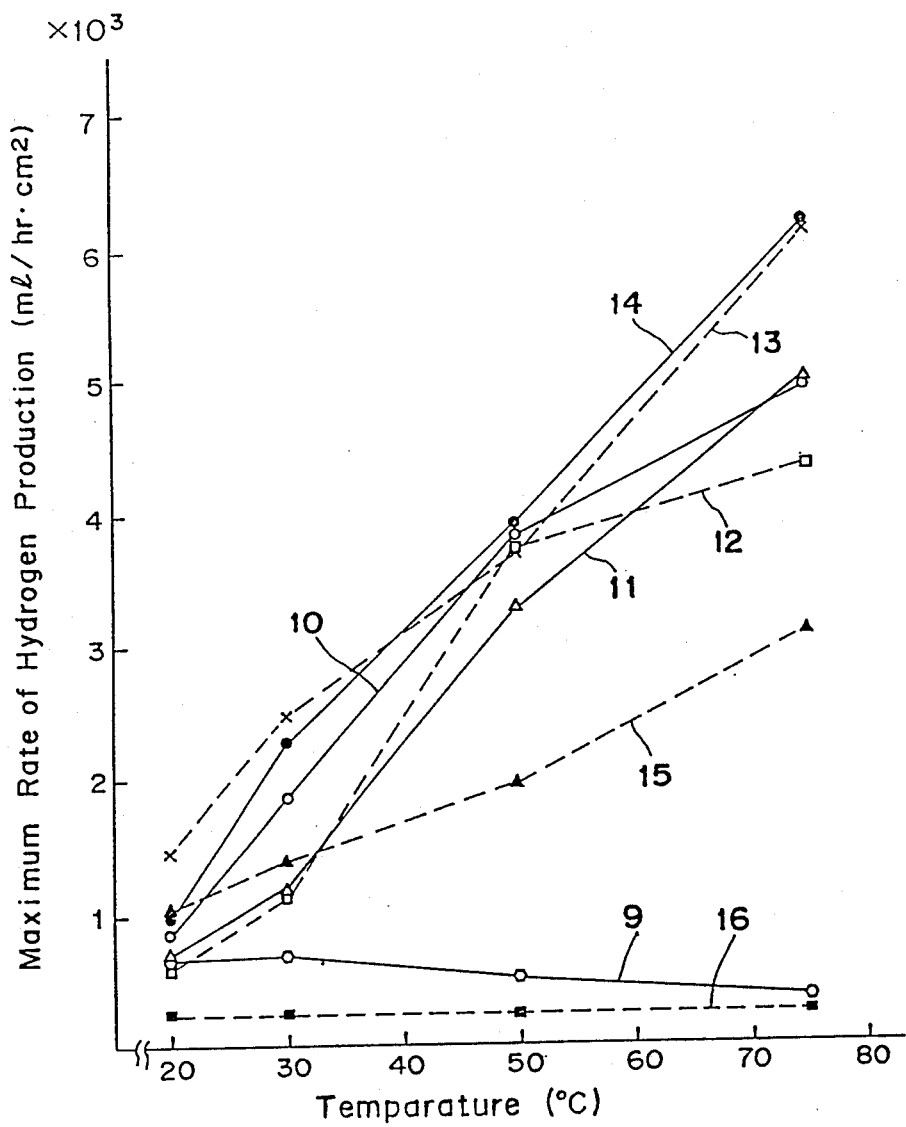
FIG. 6 is a graph showing variations of the maximum rate of hydrogen production with a temperature for various hydrogen-producing materials each being composed of a spray deposit formed on an acrylic resin plate.

FIG. 5 shows variation of a hydrogen production rate with temperature for the hydrogen-producing materials each comprising a deposit of aluminum alloy formed on the aluminum plates and FIG. 6 shows variations of the hydrogen production rate with temperature for various hydrogen-producing material comprising the deposit of aluminum alloy formed on the acrylic resin plate.

TABLE 4

| Specimen No. | Wire No. | Maximum rate of hydrogen production (ml/hr · cm$^2$) | | |
|---|---|---|---|---|
| | | At 20° C. | At 50° C. | At 75° C. |
| 7 | 1 | 991 | 670 | 580 |
| 8 | 2 | 750 | 2326 | 5292 |
| 9 | 3 | 1757 | 4680 | 8640 |
| 10 | 4 | 3281 | 4416 | 4037 |
| 11 | 5 | 2313 | 4242 | 6513 |
| 12 | 6 | 1487 | 3204 | 5733 |
| 13 | 7 | 1262 | 2742 | 5016 |
| 14 | 8 | 287 | 500 | 207 |
| 15 | 1 | 673 | 515 | 365 |
| 16 | 2 | 850 | 3788 | 4880 |
| 17 | 3 | 670 | 3228 | 4939 |
| 18 | 4 | 621 | 3396 | 4317 |
| 19 | 5 | 1473 | 3706 | 6157 |
| 20 | 6 | 984 | 3858 | 6176 |
| 21 | 7 | 1029 | 1924 | 3043 |
| 22 | 8 | 255 | 231 | 238 |

As can be seen from the results shown in Table 4 and FIGS. 5 and 6, the hydrogen-producing materials make it possible to obtain a considerably high rate of hydrogen production which is not less than 20 times that of the old electrolysis process even at about room temperature. The rate of hydrogen production rises with increasing temperature and reaches at 75° C. a value which is about 300 times as fast as that of the old electrolysis process.

From the results in FIGS. 5 and 6, it will be seen that the rate of hydrogen production is greatly affected by the temperature and tin content. Also, the hydrogen production rate depends on the material of the base and can be increased by the use of aluminum as a material for the base.

What I claim is:

1. A hydrogen-producing aluminum alloy consisting essentially of, by weight, 5 to 50% of tin and the balance being aluminum and inevitable impurities, said aluminum alloy being produced by a continuous casting process in which a molten alloy of said aluminum and tin composition is withdrawn through a heating casting mold.

2. A hydrogen-producing material comprising a spray deposit of an aluminum alloy formed on a base member, said base member selected from the group consisting of a plate, sheet or band, said aluminum alloy consisting essentially of 5 to 50%, by weight, of tin and the balance being aluminum and inevitable impurities.

3. The hydrogen-producing material according to claim 2 wherein said spray deposit is formed by wire frame spraying.

4. The hydrogen-producing aluminum alloy according to claim 1 wherein said aluminum alloy is in a form selected from the group consisting of sheets, powders, or sprayed coatings.

5. The hydrogen-producing material of claim 3, wherein said base member comprises a material selected from the group consisting of metals, plastics, glasses and ceramics.

6. The hydrogen-producing material of claim 5 wherein said metal is selected from the group consisting of mild steels, aluminum, copper, and their alloys.

7. The hydrogen-producing material of claim 5 wherein said metal is aluminum.

8. The hydrogen-producing materials of claim 5 wherein said plastic is selected from the group consisting of acrylic resins, phenolic resins, and polycarbonates.

9. The hydrogen-producing material of claim 3 wherein said alloy comprises 10–30% tin and the balance aluminum.

10. The hydrogen-producing material of claim 3 wherein said alloy comprises 20% tin and the balance aluminum.

11. A process for producing hydrogen gas comprising contacting an alloy consisting essentially of 5 to 50% tin and the balance aluminum with water and collecting the hydrogen gas, said alloy being produced by a continuous casting process in which a molten alloy of said aluminum and tin composition is withdrawn through a heating casting mold.

12. The process of claim 11 wherein said alloy comprises a spray deposit of flat, fine metal particles.

13. The process of claim 11 wherein said alloy is in a form selected from among sheets, powders, and sprayed coatings.

14. The process of claim 11 wherein said alloy comprises a sprayed coating of the alloy on a base member selected from the group consisting of metals, plastics, glasses, or ceramics.

15. The process of claim 14 wherein said metal is selected from the group consisting of mild steels, aluminum, copper, and their alloys.

16. The process of claim 14 wherein said plastic is selected from the group consisting of acrylic resins, phenolic resins, and polycarbonates.

17. The process of claim 11 wherein said rate of hydrogen evolution varies directly with temperature.

18. The process of claim 11 wherein said water is maintained at a temperature of from about 20° to about 75° C.

19. The process of claim 14 wherein said water is maintained at 75° C.

20. A hydrogen-producing aluminum alloy according to claim 1 wherein the content of tin is 10 to 30% by weight.

* * * * *